United States Patent
Hizaki (10) Patent No.: US 12,334,755 B2
(45) Date of Patent: Jun. 17, 2025

(54) INFORMATION PROCESSING SYSTEM, ECU, AND INFORMATION PROCESSING METHOD

(71) Applicant: TOYOTA JIDOSHA KABUSHIKI KAISHA, Toyota (JP)

(72) Inventor: Masaya Hizaki, Nagareyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 863 days.

(21) Appl. No.: 17/532,419

(22) Filed: Nov. 22, 2021

(65) Prior Publication Data

US 2022/0239118 A1 Jul. 28, 2022

(30) Foreign Application Priority Data

Jan. 26, 2021 (JP) .................... 2021-010192

(51) Int. Cl.
*H02J 7/00* (2006.01)
*B60L 15/20* (2006.01)
*B60L 53/30* (2019.01)
*B60L 53/60* (2019.01)
*B60L 58/12* (2019.01)
*H04W 52/02* (2009.01)

(52) U.S. Cl.
CPC .......... *H02J 7/00032* (2020.01); *B60L 15/20* (2013.01); *B60L 53/305* (2019.02); *B60L 53/60* (2019.02); *B60L 58/12* (2019.02); *H02J 7/0047* (2013.01); *H02J 7/00712* (2020.01); *H04W 52/0229* (2013.01); *B60L 2240/70* (2013.01)

(58) Field of Classification Search
CPC ........ B60L 15/20; B60L 53/305; B60L 53/60; B60L 58/12; B60L 2240/70; H02J 7/00032; H02J 7/0047; H02J 7/00712; H04W 52/0229
USPC ............................................ 320/109; 701/22
See application file for complete search history.

(56) References Cited

U.S. PATENT DOCUMENTS

2008/0185999 A1* 8/2008 Matsukawa ......... H02J 7/00712
320/166
2013/0069589 A1* 3/2013 Kai ........................ B60L 53/66
320/109

FOREIGN PATENT DOCUMENTS

| JP | 2006-074867 A | 3/2006 |
| JP | 2010-140451 A | 6/2010 |
| JP | 2012-222931 A | 11/2012 |
| JP | 2014-234100 A | 12/2014 |

* cited by examiner

*Primary Examiner* — Zixuan Zhou (57) ABSTRACT

In an information processing system including: a plurality of ECUs mounted on a vehicle equipped with a battery that is chargeable with an external power supply; and a communication terminal mounted on the vehicle, when the communication terminal is in a sleep state, a predetermined ECU among the plurality of ECUs activates the communication terminal, triggered by detection of start of charging of the battery with an external power supply. The communication terminal activated by the predetermined ECU acquires alarm information that is information regarding presence or absence of an alarm in a device mounted on the vehicle, from the plurality of ECUs. The communication terminal transmits the alarm information acquired from the plurality of ECUs to a predetermined server.

8 Claims, 9 Drawing Sheets

INFORMATION PROCESSING SYSTEM, ECU, AND INFORMATION PROCESSING METHOD

CROSS-REFERENCE TO RELATED APPLICATION

This application claims priority to Japanese Patent Application No. 2021-010192 filed on Jan. 26, 2021, incorporated herein by reference in its entirety.

BACKGROUND

1. Technical Field

The present disclosure relates to an information processing system, an electronic control unit (ECU), and an information processing method.

2. Description of Related Art

An in-vehicle communication device for transmitting abnormality information to an information center when an abnormality occurs in a device mounted on a vehicle is known (see, for example, Japanese Unexamined Patent Application Publication No. 2014-234100 (JP 2014-234100 A)).

SUMMARY

An object of the present disclosure is to provide a technique capable of transmitting alarm information to a predetermined server even when the battery is charged with an external power supply.

The present disclosure can be regarded as an information processing system including: a plurality of electronic control units (ECUs) mounted on a vehicle equipped with a battery that is chargeable with an external power supply and configured to control an in-vehicle device including a battery; and a communication terminal mounted on the vehicle, the communication terminal acquiring alarm information that is information regarding presence or absence of an alarm in the in-vehicle device from the plurality of ECUs and transmitting the acquired alarm information to a predetermined server when the communication terminal is in an activated state, and the communication terminal stopping acquisition of the alarm information and transmission of the alarm information to the predetermined server when the communication terminal is in a sleep state. In the information processing system in that case, for example, when the communication terminal is in the sleep state, a predetermined ECU among the plurality of ECUs may execute detecting start of charging of the battery with an external power supply, and shifting the communication terminal from the sleep state to an activated state, triggered by detection of the start of charging of the battery with an external power supply.

The present disclosure can also be regarded as an ECU mounted on a vehicle equipped with a battery that is chargeable with an external power supply. In that case, the ECU may include a control unit that executes, for example, when a communication terminal mounted on the vehicle is in a sleep state, detecting start of charging of the battery with an external power supply, and shifting the communication terminal from the sleep state to an activated state, triggered by detection of the start of charging of the battery with an external power supply.

The present disclosure can also be regarded as an information processing method. In the information processing method in that case, for example, an ECU mounted on a vehicle equipped with a battery that is chargeable with an external power supply may execute, when a communication terminal mounted on the vehicle is in a sleep state, a step of detecting start of charging of the battery with an external power supply, and a step of shifting the communication terminal from the sleep state to an activated state, triggered by detection of the start of charging of the battery with an external power supply.

The present disclosure can also be regarded as a program for causing the ECU to execute the above information processing method, or a non-transitory storage medium that stores the program.

According to the present disclosure, it is possible to provide a technique capable of transmitting alarm information to a predetermined server even when a battery is charged with an external power supply.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In recent years, with the progress of vehicle communication technology such as Vehicle-to-Everything (V2X), development of a vehicle equipped with a device (communication terminal) capable of communicating with an external device has been promoted. In such a vehicle, the communication terminal can collect information (alarm information) regarding presence or absence of an alarm of devices mounted on the vehicle (hereinafter, may be referred to as "in-vehicle devices") and transmit the collected alarm information to an external server and the like.

Here, in new energy vehicles such as electric vehicles (EVs) and plug-in hybrid vehicles (PHVs), the alarm information may be required by laws, regulations, and the like to be transmitted periodically to a server (predetermined server) operated by a public institution and the like. In particular, for vehicles equipped with a battery that can be charged with an external power supply, the alarm information may be required to be transmitted periodically to the predetermined server when the battery is being charged with an external power supply as well as when the vehicle is in operation.

The battery is charged with an external power supply when the vehicle is not in operation. Therefore, there is a possibility that the communication terminal is in the sleep state when the battery is charged with the external power supply. The communication terminal can acquire the alarm information and transmit the alarm information to a predetermined server when the communication terminal is in the activated state. However, when the communication terminal is in the sleep state, the communication terminal cannot acquire the alarm information and transmit the alarm information to the predetermined server.

Therefore, in order to comply with the above-mentioned laws, regulations, and the like, a technique is desired that is capable of acquiring alarm information and transmitting the alarm information to a predetermined server when the battery is charged with a external power supply.

Thus, in the information processing system according to the present disclosure, when the communication terminal is in the sleep state, the communication terminal is shifted from the sleep state to the activated state, triggered by a fact that a predetermined ECU, among a plurality of ECUs mounted on a vehicle, detects the start of charging of the battery with an external power supply. This enables the communication terminal to acquire the alarm information through the plurality of ECUs and transmit the acquired alarm information to the predetermined server.

With the information processing system according to the present disclosure, it is possible to transmit the alarm information to the predetermined server even when the battery is charged with an external power supply.

Here, the predetermined ECU according to the present disclosure may be, for example, an ECU for controlling charging of the battery (first ECU), among the plurality of ECUs mounted on the vehicle. When the vehicle is not in operation, the plurality of ECUs mounted on the vehicle may be in the sleep state as is the communication terminal. However, when the charging cable is connected to the charging port of the vehicle at the start of charging of the battery with an external power supply, a detection signal of a sensor for detecting the connection of the charging cable to the charging port or a control pilot (CPLT) signal from the external power supply and the like is input to the first ECU, which activates the first ECU. In addition, when timer charging (charging of the battery at a preset time such as nighttime) is performed with the charging connector connected to the charging port of the vehicle in advance, a signal from the timer is input to the first ECU at a timing that the charging start time arrives, which activates the first ECU. Thereby, the first ECU can detect the start of charging of the battery with an external power supply. Thus, by using such a first ECU, it is possible to activate the communication terminal that was in the sleep state. As a result, the alarm information can be transmitted to the predetermined server even when the battery is charged with an external power supply.

Further, the predetermined ECU according to the present disclosure may be a second ECU that is activated by the above first ECU when the charging of the battery with an external power supply is started. The "second ECU" here is, for example, an ECU for managing the state of the battery (state of charge (SOC), temperature, and the like). When the battery is charged with an external power supply, it is necessary to properly manage the state of the battery during charging. Therefore, when the charging of the battery with an external power supply is started, the second ECU as described above is activated by the first ECU. Thereby, the second ECU can detect the start of charging of the battery with an external power supply. Thus, by using such a second ECU, it is possible to activate the communication terminal that was in the sleep state.

Further, the predetermined ECU according to the present disclosure may be a third ECU that is directly connected to the battery via wiring for detecting the voltage of the battery. This assumes a vehicle (for example, PHV) driven by a hybrid system that includes a motor and an internal combustion engine. In such a vehicle, the ECU for controlling the hybrid system (third ECU) and the battery may be directly connected by wiring. In such a case, when the charging of the battery with an external power supply is started, the voltage input to the third ECU via the wiring changes. Thereby, the third ECU shifts from the sleep state to the activated state, triggered by the change in the voltage input via the wiring. At that time, the third ECU can detect the start of charging of the battery based on the change in the voltage input via the wiring. Thus, by using such a third ECU, it is possible to activate the communication terminal that was in the sleep state.

Here, when the predetermined ECU according to the present disclosure activates the communication terminal, the predetermined ECU may transmit to the communication terminal a first signal indicating that the charging of the battery with an external power supply has been started. Thereby, the communication terminal can start the acquisition of the alarm information and the transmission of the acquired alarm information to the predetermined server, triggered by the reception of the first signal.

When the charging of the battery with an external power supply is ended, the predetermined ECU according to the present disclosure may transmit to the communication terminal a second signal indicating that the charging of the battery with an external power supply has been ended. Thereby, the communication terminal can end the acquisition of the alarm information and the transmission of the acquired alarm information to the predetermined server, triggered by the reception of the second signal.

EMBODIMENTS

Hereinafter, an embodiment of the present disclosure will be described with reference to the drawings. The configuration of the following embodiment is illustrative, and the present disclosure is not limited to the configuration of the embodiment.

Overall Configuration of System

Figure 1:
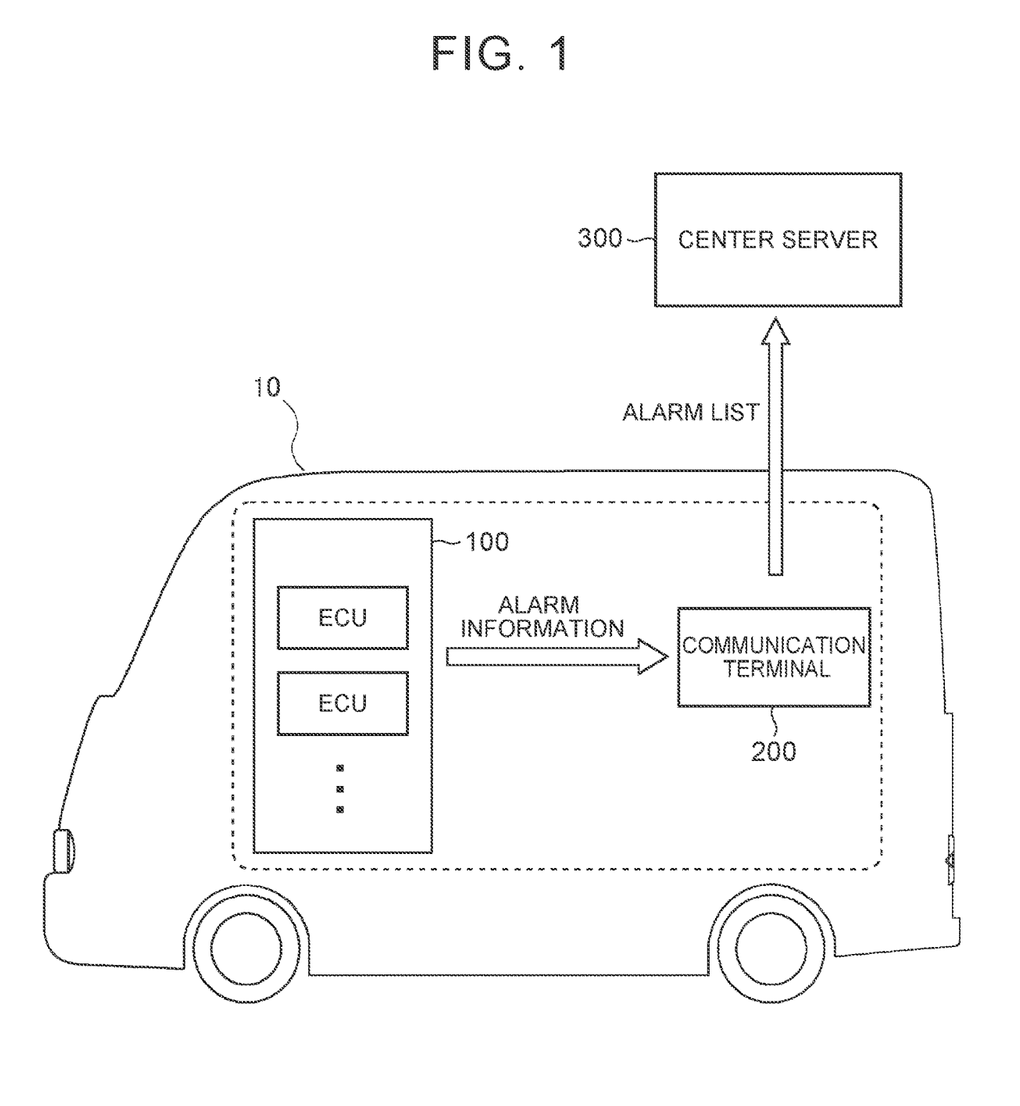
FIG. 1 is a diagram showing an outline of an in-vehicle system.

FIG. 1 is a diagram showing a schematic configuration of an in-vehicle system to which the present disclosure is applied. The in-vehicle system in the present embodiment includes a plurality of ECUs 100 mounted on a vehicle 10 and a communication terminal 200 mounted on the vehicle 10.

The vehicle 10 in this example is a PHV equipped with a hybrid system including a battery that can be charged with an external power supply. The hybrid system includes a battery that can be charged with an external power supply, a motor generator that uses electric power of the battery to drive the drive wheels of the vehicle 10 or uses kinetic energy of the drive wheels to generate electricity, an internal combustion engine that cooperates with the motor generator to cause the vehicle 10 to travel (hereinafter, may be referred to as "engine"), an inverter for converting the electric power supplied from the battery to the motor generator from direct current to alternating current, or converting the electric power supplied from the motor generator to the battery from alternating current to direct current, and the like. The vehicle 10 is not limited to the PHV, and may be an EV.

Figure 2:
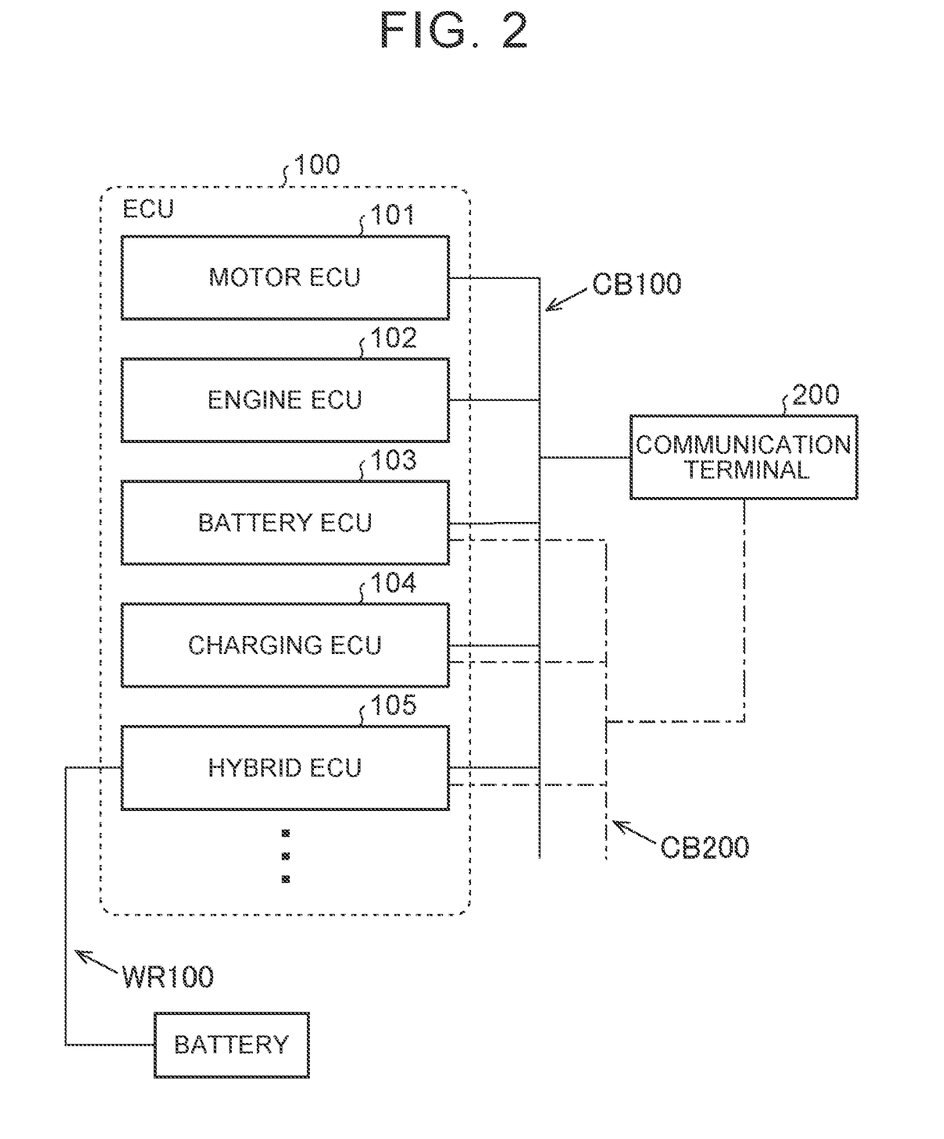
FIG. 2 is a diagram showing examples of electronic control units (ECUs) mounted on a vehicle.

The plurality of ECUs 100 represents electronic control units for controlling various in-vehicle devices such as the above-mentioned battery, motor generator, engine, and hybrid system. As shown in FIG. 2, the plurality of ECUs 100 in this example includes an ECU (motor ECU) 101 for controlling a motor generator, an ECU (engine ECU) 102 for controlling an engine, an ECU (battery ECU) 103 for managing the state of the battery (for example, SOC or temperature), an ECU (charging ECU) 104 for controlling charging of the battery, an ECU (hybrid ECU) 105 for integrally controlling the overall hybrid system, and the like. The plurality of ECUs 100 is connected to each other by a first bus CB100 of controller area network (CAN) standard. Among the plurality of ECUs 100, the ECUs related to the battery (battery ECU 103, charging ECU 104, hybrid ECU 105, and the like) are also connected to each other by a second bus CB200 of the CAN standard. Of the ECUs 103 to 105 related to the battery, the hybrid ECU 105 is directly connected to the battery via a wiring WR100, and can directly monitor the voltage of the battery.

Each of the plurality of ECUs 100 has a function of transmitting alarm information to the communication terminal 200 at a predetermined cycle when the vehicle 10 is in operation (when the ignition switch or the power switch is in ON state). Among the plurality of ECUs 100, the ECUs 103 to 105 related to the battery have a function of transmitting the alarm information to the communication terminal 200 at a predetermined cycle during a period in which the battery is being charged with an external power supply, even when the vehicle 10 is not in operation (when the ignition switch or the power switch is in OFF state). Along with this, among the ECUs 103 to 105 related to the battery, the charging ECU 104 also has a function of activating the communication terminal 200 when the charging of the battery with an external power supply is started. Such a charging ECU 104 corresponds to the "predetermined ECU (first ECU)" according to the present disclosure. In the present embodiment, the ECUs 103 to 105 related to the battery correspond to the "plurality of ECUs" according to the present disclosure.

The communication terminal 200 is connected to the first bus CB100 and the second bus CB200. The communication terminal 200 has a function of receiving the alarm information from each ECU 100 via the first bus CB100 or the second bus CB200. The communication terminal 200 also has a function of aggregating the received alarm information and transmitting the aggregation result (hereinafter, may be referred to as "alarm list") to the center server 300. These functions are enabled when the communication terminal 200 is in the activated state, and disabled when the communication terminal 200 is in the sleep state. The center server 300 is a server operated by a public institution. The "public institution" here is, for example, an institution that requires new energy vehicles to periodically provide the alarm list. In this example, it is assumed that the alarm list is required to be periodically provided when the battery is being charged with an external power supply as well as when the vehicle 10 is in operation.

In the in-vehicle system configured as described above, when the vehicle 10 is in operation, each of the plurality of ECUs 100 transmits the alarm information to the communication terminal 200 at a predetermined cycle. At that time, the alarm information is transmitted using the first bus CB100. Each time the communication terminal 200 receives the alarm information from the plurality of ECUs 100, the communication terminal 200 aggregates the alarm information to generate an alarm list and transmits the generated alarm list to the center server 300.

Further, when the battery is charged with an external power supply, only the ECUs 103 to 105 related to the battery, among the plurality of ECUs 100, transmit the alarm information to the communication terminal 200 at a predetermined cycle. At that time, the alarm information is transmitted using the second bus CB200. Each time the communication terminal 200 receives the alarm information from the ECUs 103 to 105 related to the battery, the communication terminal 200 aggregates the alarm information to generate an alarm list and transmits the generated alarm list to the center server 300.

The battery is charged with an external power supply when the vehicle 10 is not in operation. When the vehicle 10 is not in operation, the communication terminal 200 is in the sleep state unless a special event (for example, activation of the security system) occurs. Therefore, when charging of the battery with an external power supply is started, it is necessary to shift the communication terminal 200 from the sleep state to the activated state. In contrast, in this example, the charging ECU 104 activates the communication terminal 200 when charging of the battery with an external power supply is started. As a result, even when the battery is charged with an external power supply, the communication terminal 200 can receive the alarm information and transmit the alarm list to the center server 300.

Hardware Configuration of In-Vehicle System

Figure 3:
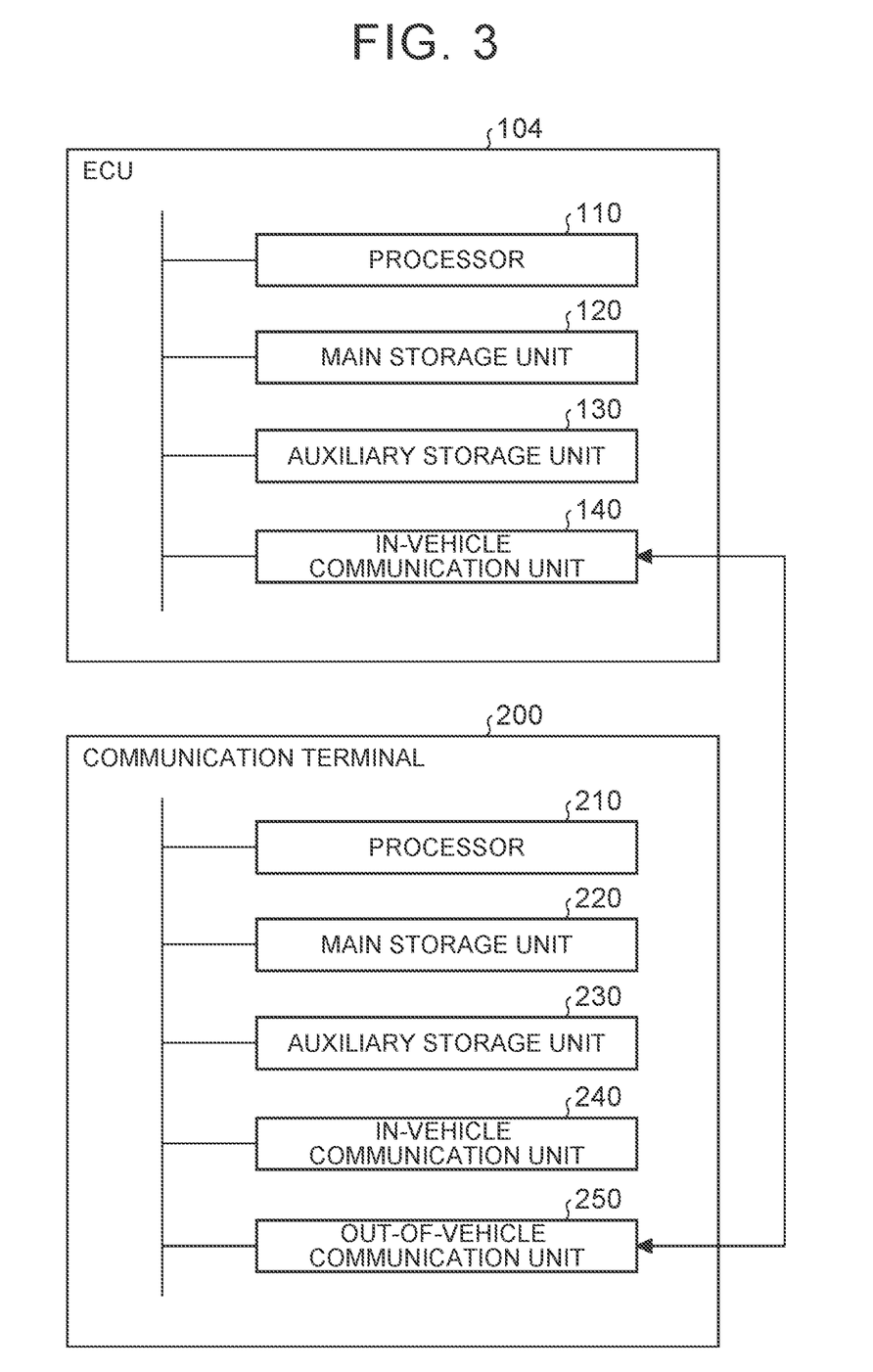
FIG. 3 is a diagram showing an example of a hardware configuration of components included in the in-vehicle system.

FIG. 3 is a diagram showing an example of a hardware configuration of the ECU 100 and the communication terminal 200 included in the in-vehicle system. Although only the charging ECU 104, among the plurality of ECUs 100, is shown in FIG. 3, the hardware configurations of the other ECUs 100 are the same.

The charging ECU 104 is an electronic control unit for controlling the in-vehicle device. The charging ECU 104 shifts from the activated state to the sleep state when the ignition switch or the power switch is switched from ON to OFF. Further, the charging ECU 104 shifts from the sleep state to the activated state when the ignition switch or the power switch is switched from OFF to ON and when various trigger signals are received or input. When the charging ECU 104 is in the activated state, the charging ECU 104 performs various processes for controlling the in-vehicle device and also performs various processes for transmitting the alarm information to the communication terminal 200 at a predetermined cycle. As shown in FIG. 3, the charging ECU 104 includes a processor 110, a main storage unit 120, an auxiliary storage unit 130, and an in-vehicle communication unit 140. The charging ECU 104 implements a function that meets a predetermined purpose, as the processor 110 loads a program stored in the auxiliary storage unit 130 into a work area of the main storage unit 120 and executes the program.

The processor 110 is, for example, a central processing unit (CPU) or a digital signal processor (DSP). The processor 110 controls the ECU 100 and performs various information processing calculations.

The main storage unit 120 includes, for example, a random access memory (RAM), a read-only memory (ROM), and the like. As described above, in the main storage unit 120, the work area for the processor to execute the program is set.

The auxiliary storage unit 130 includes, for example, an erasable programmable ROM (EPROM), a hard disk drive (HDD), and the like. The auxiliary storage unit 130 stores various programs, various kinds of data, and various tables in a recording medium such that they are readable and writable. The programs stored in the auxiliary storage unit 130 include, in addition to an operating system (OS) and the like, a program for implementing a function of transmitting the alarm information to the communication terminal 200 at a predetermined cycle. Such a program is common to all of the plurality of ECUs 100. In addition, the auxiliary storage unit 130 also stores a program specific to the charging ECU 104. The program specific to the charging ECU 104 is, for example, a program for implementing a function of activating the communication terminal 200 when charging of the battery with an external power supply is started. Part or all of the information stored in the auxiliary storage unit 130 may be stored in the main storage unit 120. Further, part of the information stored in the main storage unit 120 may be stored in the auxiliary storage unit 130.

The in-vehicle communication unit 140 is an interface for connecting the ECU 100 to the first bus CB100 or the second bus CB200. The in-vehicle communication unit 140 is connected to the first bus CB100 or the second bus CB200 using, for example, a CAN standard interface circuit. In the present embodiment, the in-vehicle communication unit 140 communicates with another ECU 100 and the communication terminal 200 through the first bus CB100 or the second bus CB200.

The series of processes executed by the ECU 100 configured as described above can be executed by hardware or software.

Next, the communication terminal 200 is a terminal having a function of transmitting and receiving data to and from the plurality of ECUs 100 and a function of transmitting and receiving data to and from the center server 300. The communication terminal 200 shifts from the activated state to the sleep state when the ignition switch or the power switch is switched from ON to OFF. Further, the communication terminal 200 shifts from the sleep state to the activated state when the ignition switch or the power switch is switched from OFF to ON and when various trigger signals are received or input. When the communication terminal 200 is in the activated state, the communication terminal 200 performs various processes for transmitting the alarm list to the center server 300 at a predetermined cycle. As shown in FIG. 3, the communication terminal 200 includes a processor 210, a main storage unit 220, an auxiliary storage unit 230, an in-vehicle communication unit 240, an out-of-vehicle communication unit 250, and the like. The communication terminal 200 implements a function that meets a predetermined purpose, as the processor 210 loads a program stored in the auxiliary storage unit 230 into a work area of the main storage unit 220 and executes the program.

Since the processor 210, the main storage unit 220, and the in-vehicle communication unit 240 are the same as the processor 110, the main storage unit 120, and the in-vehicle communication unit 140 of the ECU 100, the description thereof will be omitted.

The auxiliary storage unit 230 may include a removable medium in addition to the same configuration as that of the auxiliary storage unit 130 of the ECU 100. The removable medium is, for example, a universal serial bus (USB) memory or a disc recording medium such as a compact disc (CD) or a digital versatile disc (DVD). Further, the program stored in the auxiliary storage unit 230 includes a program for implementing a function for transmitting the alarm list to the center server 300 when the communication terminal 200 is in the activated state.

The out-of-vehicle communication unit 250 is an interface for connecting the communication terminal 200 to the network. The out-of-vehicle communication unit 250 connects to the network by a mobile communication method such as long term evolution (LTE), LTE-advanced, and 5th generation (5G), or a wireless communication method such as Wi-Fi. In the present embodiment, the out-of-vehicle communication unit 250 communicates with the center server 300 through the network.

The series of processes executed by the communication terminal 200 configured as described above can be executed by hardware or software.

Functional Configuration of ECU

Figure 4:
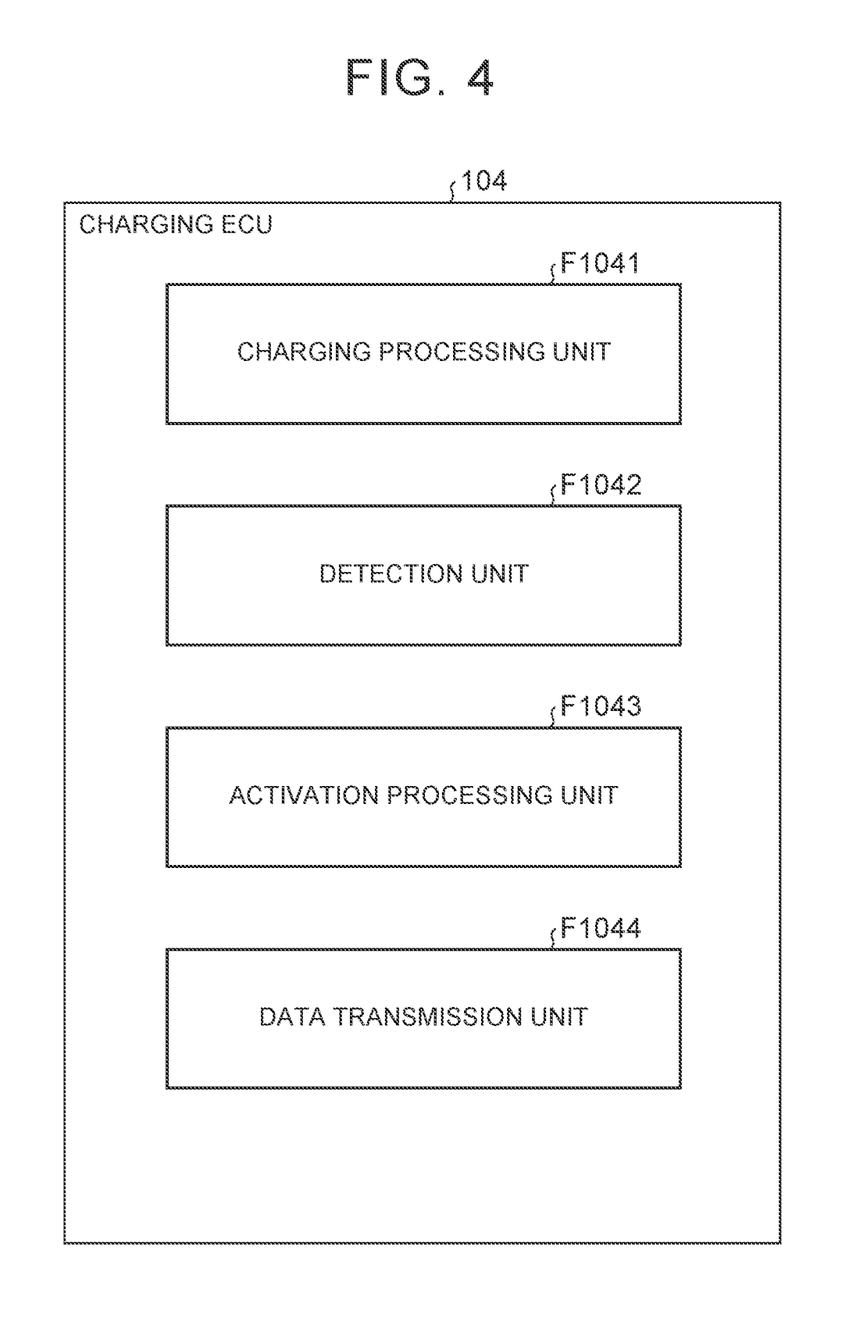
FIG. 4 is a block diagram showing an example of a functional configuration of a charging ECU.

Here, an example of the functional configuration of the charging ECU 104 in the present embodiment will be described with reference to FIG. 4. As shown in FIG. 4, the charging ECU 104 in the present embodiment includes a charging processing unit F1041, a detection unit F1042, an activation processing unit F1043, and a data transmission unit F1044 as its functional components. The charging processing unit F1041, the detection unit F1042, the activation processing unit F1043, and the data transmission unit F1044 are implemented, as the processor 110 executes a program loaded on the main storage unit 120. These functional components work when the charging ECU 104 is in the activated state and do not work when the charging ECU 104 is in the sleep state. Among the functional components of the charging ECU 104, the combination of the detection unit F1042 and the activation processing unit F1043 corresponds to the "control unit" of the ECU according to the present disclosure.

The charging processing unit F1041 performs various processes for charging the battery with an external power supply. Here, when the vehicle 10 is not in operation, the plurality of ECUs 100 including the charging ECU 104 is also in the sleep state similarly to the communication terminal 200. In such a state, when a charging cable from the external power supply is connected to the charging port of the vehicle 10, a detection signal of a sensor for detecting connection of the charging cable to the charging port or a trigger signal such as a CPLT signal from the external power supply is input to the charging ECU 104. Examples of the above-mentioned sensor include a limit switch, a proximity sensor, a photoelectric sensor, and the like. When timer-charging is performed with the charging connector connected to the charging port of the vehicle 10 in advance, a trigger signal is input from the timer to the charging ECU 104 at the timing when the charging start time arrives. When the various trigger signals described above are input to the charging ECU 104, the charging ECU 104 shifts from the sleep state to the activated state. The charging ECU 104 activated in this way starts charging of the battery from the external power supply. For example, the charging processing unit F1041 switches a relay provided between the charging port of the vehicle 10 and the battery from OFF (a state in which the charging port and the battery are not electrically connected) to ON (a state in which the charging port and the battery are electrically connected), thereby starting charging of the battery from the external power supply. Further, when starting charging of the battery from the external power supply, the charging processing unit F1041 transmits a trigger signal for shifting the battery ECU 103 from the sleep state to the activated state through the second bus CB200. Thereby, when the battery is being charged with an external power supply, the charging processing unit F1041 can acquire the SOC or the temperature and the like of the battery through the battery ECU 103. As a result, the charging processing unit F1041 can control the magnitude and the like of the current flowing from the external power supply to the battery based on the information acquired from the battery ECU 103. Further, when the SOC of the battery reaches a predetermined value, the charging processing unit F1041 can end the charging of the battery with the external power supply by switching the above-mentioned relay from ON to OFF.

The detection unit F1042 detects start of charging and end of charging of the battery with an external power supply. For example, the detection unit F1042 detects the start of charging and the end of charging of the battery with an external power supply by monitoring the state of the above-mentioned relay. That is, when the relay is switched from OFF to ON, the detection unit F1042 determines that charging of the battery with an external power supply has been started. When the relay is switched from ON to OFF, the detection unit F1042 determines that charging of the battery with an external power supply has been ended. The charging processing unit F1041 may notify the detection unit F1042 of the start of charging and the end of charging of the battery with an external power supply. When the detection unit F1042 detects the start of charging and the end of charging of the battery with an external power supply, the detection result is passed to the activation processing unit F1043.

The activation processing unit F1043 transmits a trigger signal for shifting the communication terminal 200 from the sleep state to the activated state to the communication terminal 200 through the second bus CB200 when the start of charging of the battery with an external power supply is detected. Following the trigger signal described above, the activation processing unit F1043 transmits a signal (first signal) indicating that charging of the battery with an external power supply has been started, to the communication terminal 200 through the second bus CB200. Further, when the end of charging of the battery with an external power supply is detected, the activation processing unit F1043 transmits a signal (second signal) indicating that the charging of the battery with an external power supply has been ended, to the communication terminal 200 through the second bus CB200.

The data transmission unit F1044 generates the alarm information and transmits the generated alarm information to the communication terminal 200. At that time, when the vehicle 10 is in operation, the data transmission unit F1044 transmits the alarm information to the communication terminal 200 through the first bus CB100. Further, when the battery is being charged with an external power supply, the data transmission unit F1044 transmits the alarm information to the communication terminal 200 through the second bus CB200. The generation of the alarm information and the transmission of the alarm information by the data transmission unit F1044 to the communication terminal 200 are repeatedly executed at a predetermined cycle. The alarm information generated by the data transmission unit F1044 is information indicating the presence or absence of an alarm related to the in-vehicle device under the control of the charging ECU 104. Therefore, the data transmission unit F1044 determines whether an alarm is generated in the above-mentioned in-vehicle device based on detection values of various sensors attached to the in-vehicle device under the control of the charging ECU 104 at the timing of generating the alarm information. Then, the data transmission unit F1044 generates the alarm information in accordance with the above determination result.

Among the functions of the data transmission unit F1044 described above, the function of generating the alarm information and transmitting the alarm information to the communication terminal 200 when the vehicle 10 is in operation is common to all of the plurality of ECUs 100. Further, among the functions of the data transmission unit F1044 described above, a function of generating the alarm information and transmitting the alarm information to the communication terminal 200 when the battery is being charged with an external power supply is common to only the ECUs 103 to 105 related to the battery.

Any one or part of the charging processing unit F1041, the detection unit F1042, the activation processing unit F1043, and the data transmission unit F1044 may be implemented by a hardware circuit. Further, the functional configuration of the ECU 100 is not limited to the example shown in FIG. 4, and components may be omitted, replaced, or added as appropriate.

Functional Configuration of Communication Terminal

Figure 5:
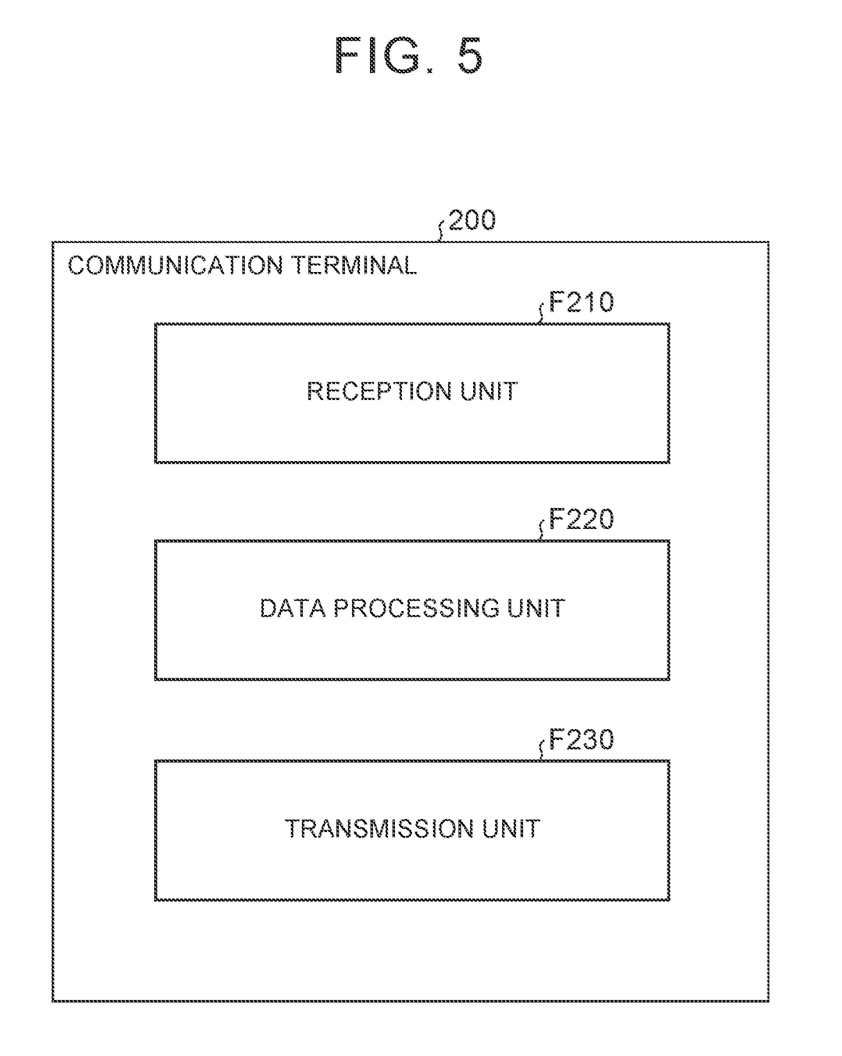
FIG. 5 is a block diagram showing an example of a functional configuration of a communication terminal.

Next, an example of the functional configuration of the communication terminal 200 in the present embodiment will be described with reference to FIG. 5. As shown in FIG. 5, the communication terminal 200 in the present embodiment includes a reception unit F210, a data processing unit F220, and a transmission unit F230 as its functional components. The reception unit F210, the data processing unit F220, and the transmission unit F230 are implemented, as the processor 210 executes a program loaded on the main storage unit 220. The reception unit F210, the data processing unit F220, and the transmission unit F230 work when the communication terminal 200 is in the activated state, and do not work when the communication terminal 200 is in the sleep state.

The reception unit F210 receives the alarm information transmitted from each ECU 100 through the in-vehicle communication unit 240. At that time, when the vehicle 10 is in operation, the reception unit F210 receives the alarm information from all of the plurality of ECUs 100. Further, when the battery is being charged with an external power supply, the reception unit F210 receives the alarm information only from the ECUs 103 to 105 related to the battery, among the plurality of ECUs 100. The alarm information is repeatedly received at a predetermined cycle during the period in which the vehicle 10 is in operation and during the period in which the battery is being charged with an external power supply. A plurality of pieces of alarm information received by the reception unit F210 is passed from the reception unit F210 to the data processing unit F220.

The data processing unit F220 generates the alarm list based on the alarm information received by the reception unit F210. The alarm list is a list required to be transmitted to the center server 300 at a predetermined cycle, and includes a plurality of items for registering presence or absence of an alarm of a type stipulated by laws, regulations, and the like, as described above. Thus, the data processing unit F220 extracts information to be registered in each item of the alarm list, from the plurality of pieces of alarm information received by the reception unit F210, and generates the alarm list based on the extracted information. The alarm list generated by the data processing unit F220 is passed from the data processing unit F220 to the transmission unit F230.

The transmission unit F230 transmits the alarm list generated by the data processing unit F220 to the center server 300 through the out-of-vehicle communication unit 250.

Any one or part of the reception unit F210, the data processing unit F220, and the transmission unit F230 may be implemented by a hardware circuit when the communication terminal 200 is activated by the charging ECU 104. Further, the functional configuration of the communication terminal 200 is not limited to the example shown in FIG. 5, and components may be omitted, replaced, or added as appropriate.

Processing Flow

Figure 6:
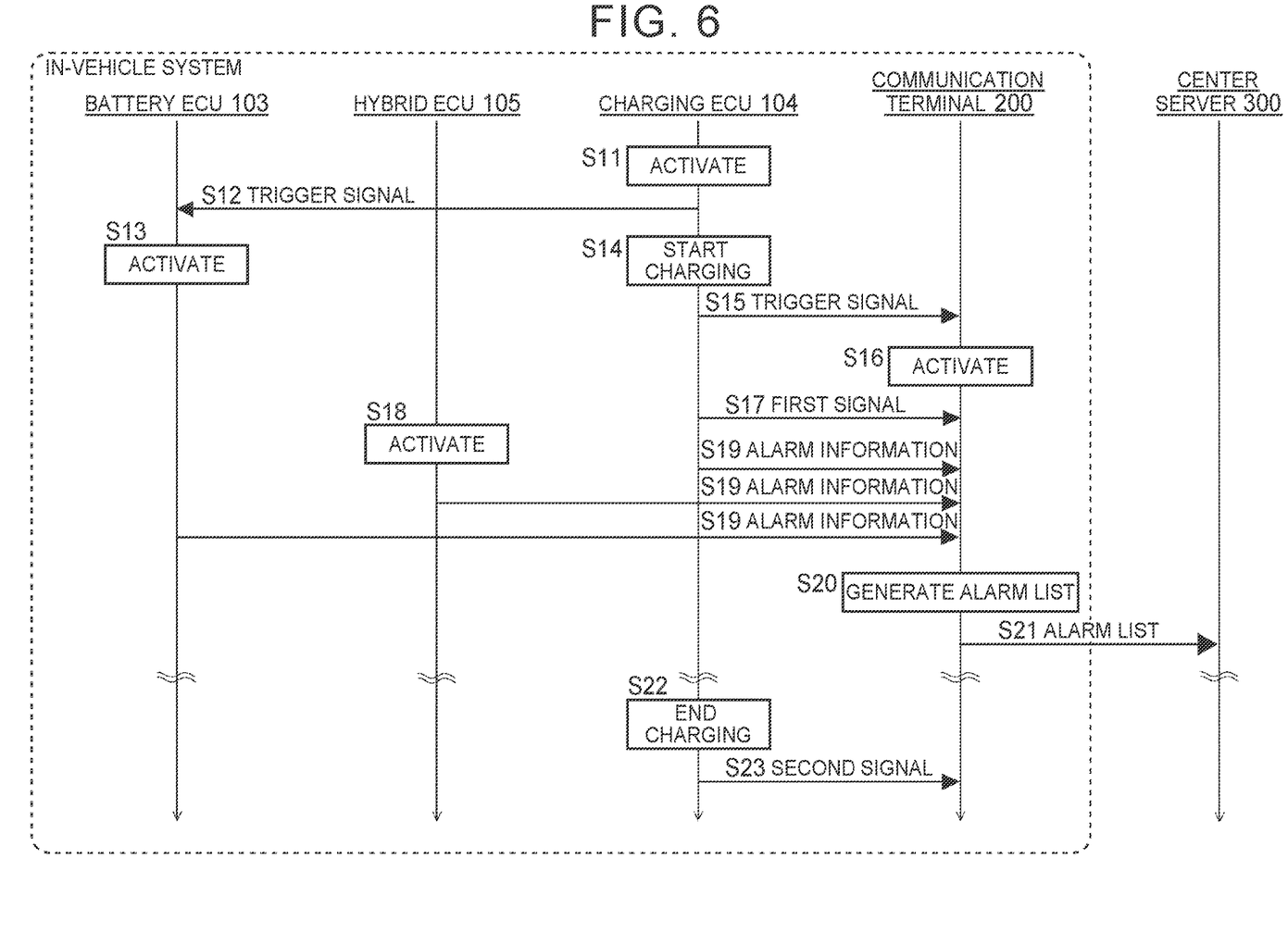
FIG. 6 is a sequence diagram showing an example of processes performed in the in-vehicle system when the battery is charged with an external power supply in the embodiment.

Next, an example of the process sequence in the in-vehicle system of the present embodiment will be described with reference to FIG. 6. FIG. 6 is a sequence diagram showing an example of processes performed in the in-vehicle system when the battery is charged with an external power supply. In the example shown in FIG. 6, it is assumed that the vehicle 10 is in operation and the ECUs 103 to 105 related to the battery and the communication terminal 200 are in the sleep state.

When charging of the battery with an external power supply is started, a trigger signal from the sensor for detecting the connection of the charging connector to the charging port, the external power supply, or the timer is input to the charging ECU 104, as described above. When receiving input of the trigger signal, the charging ECU 104 shifts from the sleep state to the activated state (S11). Accordingly, the charging ECU 104 is brought into a state of being able to control charging of the battery with an external power supply and into a state of being able to transmit the alarm information to the communication terminal 200.

In the charging ECU 104 that has shifted from the sleep state to the activated state, the charging processing unit F1041 transmits a trigger signal for shifting the battery ECU 103 from the sleep state to the activated state to the battery ECU 103 through the second bus CB200 (S12).

The battery ECU 103 that has received the trigger signal from the charging ECU 104 shifts from the sleep state to the activated state (S13). Thereby, the battery ECU 103 is brought into a state of being able to transmit information regarding the battery state (SOC, or temperature and the like) to the hybrid ECU 105 and into a state of being able to transmit the alarm information to the communication terminal 200.

The charging processing unit F1041 of the charging ECU 104 starts charging of the battery with an external power supply after activating the battery ECU 103 (S14). Specifically, as described above, the charging processing unit F1041 switches the relay provided between the charging port of the vehicle 10 and the battery from OFF to ON.

When the relay is switched from OFF to ON, the detection unit F1042 of the charging ECU 104 determines that charging of the battery with an external power supply has been started. Such a determination result is passed from the detection unit F1042 to the activation processing unit F1043. The activation processing unit F1043 transmits a trigger signal for shifting the communication terminal 200 from the sleep state to the activated state to the communication terminal 200 through the second bus CB200 (S15).

The communication terminal 200 that has received the trigger signal from the charging ECU 104 shifts from the sleep state to the activated state (S16). Thereby, the communication terminal 200 is brought into a state of being able to communicate with the ECUs 103 to 105 related to the battery and into a state of being able to communicate with the center server 300.

After activating the communication terminal 200, the activation processing unit F1043 of the charging ECU 104 transmits the first signal to the communication terminal 200 through the second bus CB200 (S17). The first signal is a signal indicating that charging of the battery with an external power supply has been started. Thereby, the communication terminal 200 is brought into a state of being able to accept the alarm information from the ECUs 103 to 105 related to the battery and into a state of being able to generate the alarm list.

Here, as described above, the hybrid ECU 105 is directly connected to the battery via a wiring WR100. Therefore, when the voltage of the battery changes with the start of charging of the battery with an external power supply, the voltage input to the hybrid ECU 105 via the wiring WR100 also changes. Thereby, the hybrid ECU 105 shifts from the sleep state to the activated state, triggered by the change in the input voltage (S18). As a result, the hybrid ECU 105 is brought into a state of being able to transmit the alarm information to the communication terminal 200, similarly to the charging ECU 104 and the battery ECU 103.

When each of the battery ECU 103, the charging ECU 104, and the hybrid ECU 105 is activated, each of the ECUs 103 to 105 transmits the alarm information to the communication terminal 200 through the second bus CB200 (S19).

When the alarm information transmitted from each of the battery ECU 103, the charging ECU 104, and the hybrid ECU 105 is received by the in-vehicle communication unit 240 of the communication terminal 200, the alarm information is passed to the data processing unit F220 through the reception unit F210. The data processing unit F220 generates the alarm list based on the above alarm information (S20).

When the alarm list is generated by the data processing unit F220, the transmission unit F230 of the communication terminal 200 transmits the alarm list to the center server 300 through the out-of-vehicle communication unit 250 (S21).

The above processes related to S19 to S21 are repeatedly executed at a predetermined cycle until the charging of the battery with an external power supply ends.

When the SOC acquired through the battery ECU 103 reaches a predetermined value, the charging processing unit F1041 of the charging ECU 104 ends the charging of the battery with an external power supply (S22). Specifically, the charging processing unit F1041 switches the above-mentioned relay from ON to OFF.

When the relay is switched from ON to OFF, the detection unit F1042 of the charging ECU 104 determines that charging of the battery with an external power supply has been ended. Such a determination result is passed from the detection unit F1042 to the activation processing unit F1043. The activation processing unit F1043 transmits a second signal to the communication terminal 200 through the second bus CB200 (S23). The second signal is a signal indicating that charging of the battery with an external power supply has been ended. Thereby, the communication terminal 200 ends the acceptance of the alarm information from the ECUs 103 to 105 related to the battery and ends the generation of the alarm list. At that time, the communication terminal 200 may shift from the activated state to the sleep state.

When the charging of the battery with an external power supply is ended, a signal similar to the second signal may be transmitted from the charging ECU 104 to the battery ECU 103 and the hybrid ECU 105. In that case, the battery ECU 103 and the hybrid ECU 105 can end the generation of the alarm information and the transmission of the alarm information to the communication terminal 200, triggered by the reception of the above signal. Further, the battery ECU 103 and the hybrid ECU 105 can also shift from the activated state to the sleep state, triggered by the reception of the above signal.

Figure 7:
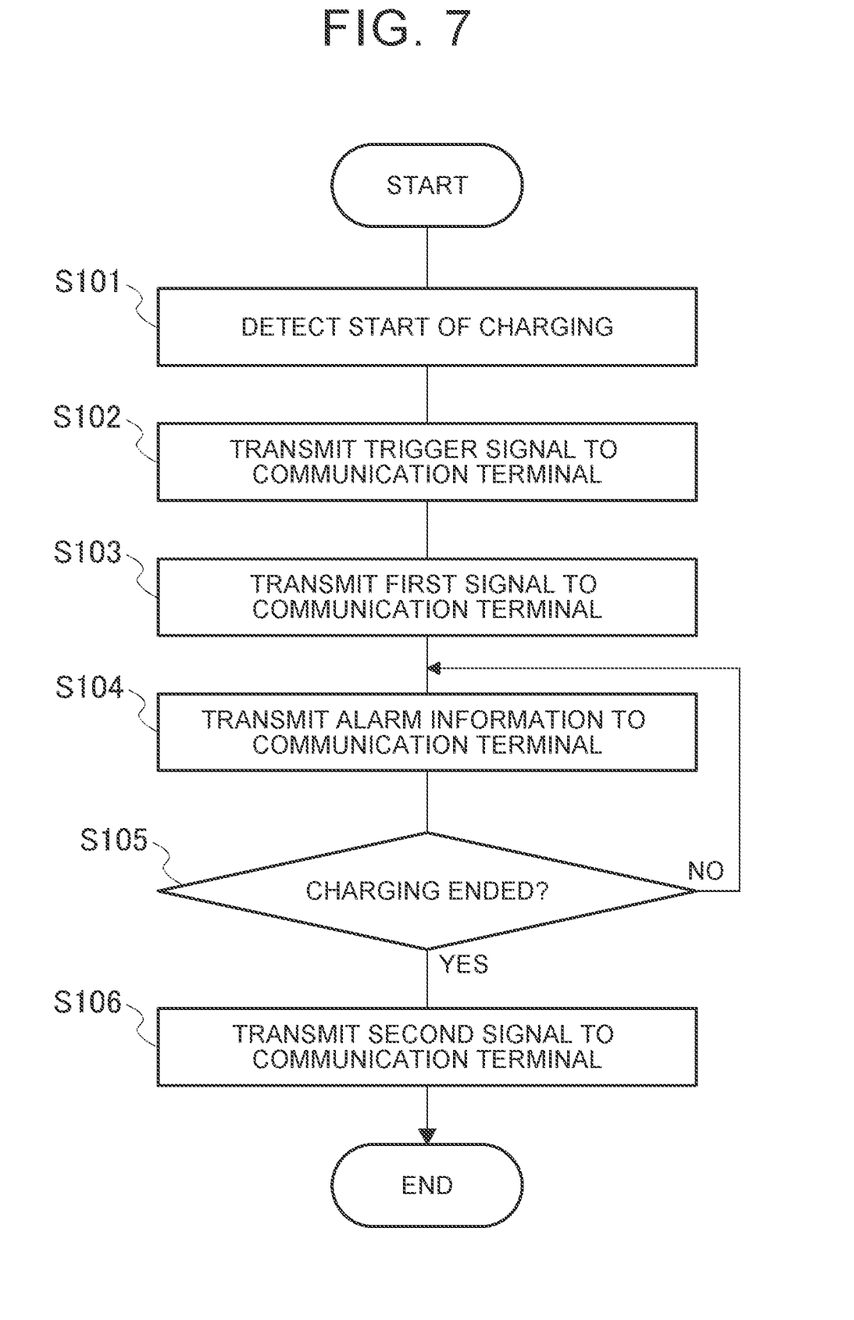
FIG. 7 is a flowchart showing a process routine performed by the charging ECU when charging of the battery with an external power supply is started.

Next, the flow of processing performed by the charging ECU 104 when the battery is charged with an external power supply will be described with reference to FIG. 7. FIG. 7 is a flowchart showing a process routine performed by the charging ECU 104 when charging of the battery with an external power supply is started. That is, FIG. 7 is a flowchart showing a process routine performed by the charging ECU 104 in S14 and subsequent steps in FIG. 6 described above.

In FIG. 7, when the above-mentioned relay is switched from OFF to ON by the charging processing unit F1041 of the charging ECU 104 to start the charging of the battery with an external power supply, the detection unit F1042 detects the start of charging of the battery with an external power supply (step S101).

When the start of charging of the battery with an external power supply is detected in step S101, the activation processing unit F1043 transmits a trigger signal for shifting the communication terminal 200 from the sleep state to the activated state, to the communication terminal 200 through the in-vehicle communication unit 140 (step S102). At that time, the in-vehicle communication unit 140 transmits the trigger signal to the communication terminal 200 using the second bus CB200. Thereby, the communication terminal 200 shifts from the sleep state to the activated state.

When the communication terminal 200 is activated in step S102, the activation processing unit F1043 transmits the first signal to the communication terminal 200 through the in-vehicle communication unit 140 and the second bus CB200 (step S103). The first signal is a signal indicating that the charging of the battery with an external power supply has been started, as described above. Thereby, the communication terminal 200 is brought into a state of being able to accept the alarm information from the ECUs 103 to 105 related to the battery and into a state of being able to generate the alarm list.

When the first signal is transmitted to the communication terminal 200 in step S103, the data transmission unit F1044 generates the alarm information and transmits the generated alarm information to the communication terminal 200 at a predetermined cycle (step S104). At that time, the data transmission unit F1044 transmits the alarm information to the communication terminal 200 through the in-vehicle communication unit 140 and the second bus CB200. The same processes are performed in the battery ECU 103 and the hybrid ECU 105, which enables the communication terminal 200 to generate the alarm list and transmit the alarm list to the center server 300 based on the alarm information received from the ECUs 103 to 105 related to the battery.

When the process of step S104 ends, the detection unit F1042 determines whether the charging of the battery with an external power supply has been ended (step S105). At that time, when the above-mentioned relay has not been switched from ON to OFF by the charging processing unit F1041 (the relay remains ON), the detection unit F1042 determines that the charging of the battery with an external power supply has not been ended (negative determination in step S105). In that case, the process of step S104 is executed again. In contrast, when the above-mentioned relay has been switched from ON to OFF by the charging processing unit F1041, the detection unit F1042 determines that the charging of the battery with an external power supply has been ended (affirmative determination in step S105). In that case, the process of step S106 is executed.

In step S106, the activation processing unit F1043 transmits the second signal to the communication terminal 200 through the in-vehicle communication unit 140 and the second bus CB200. The second signal is a signal indicating that the charging of the battery with an external power supply has been ended, as described above. Thereby, the communication terminal 200 ends the acceptance of the alarm information from the ECUs 103 to 105 related to the battery and ends the generation of the alarm list. When the process of step S106 ends, the execution of this process routine ends.

When the processes shown in FIGS. 6 and 7 are performed, the communication terminal 200 can be shifted from the sleep state to the activated state when the battery is charged with an external power supply. This enables the communication terminal 200 to accept the alarm information from the ECUs 103 to 105 related to the battery and generate the alarm list based on the alarm information. As a result, the alarm list can be transmitted to the center server 300 even when the battery is charged with an external power supply.

First Modification

In the above-described embodiment, an example in which the charging ECU 104 activates the communication terminal 200 when the battery is charged with an external power supply has been described. However, the battery ECU 103 may activate the communication terminal 200.

When the charging of the battery with an external power supply is started, the SOC and the voltage of the battery change. When the charging of the battery with an external power supply is ended, the SOC and the voltage of the battery stop changing. Here, as described in the above embodiment, the battery ECU 103 is activated by the charging ECU 104 before the charging of the battery with an external power supply is started. Therefore, the battery ECU 103 can detect the start of charging and the end of charging of the battery with an external power supply based on the SOC or the voltage of the battery.

Thus, in this modification, when the battery is charged with an external power supply, the battery ECU 103 detects the start of charging and the end of charging of the battery with an external power supply to activate the communication terminal 200 and transmit the first signal and the second signal to the communication terminal 200. In this modification, the battery ECU 103 corresponds to the "predetermined ECU (second ECU)" according to the present disclosure.

Figure 8:
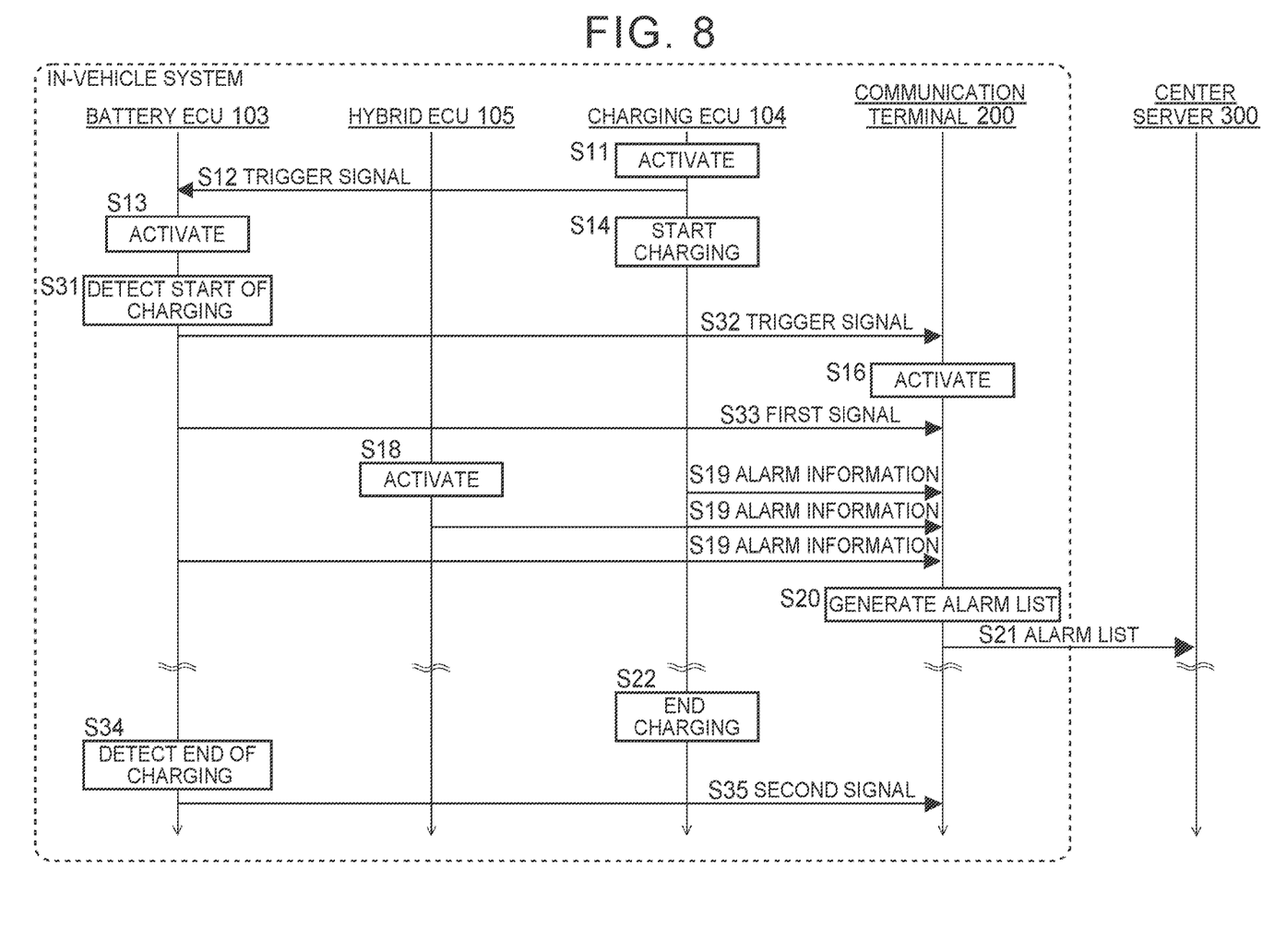
FIG. 8 is a sequence diagram showing an example of processes performed in the in-vehicle system when the battery is charged with an external power supply in a first modification.

Here, an example of the process sequence in the in-vehicle system of this modification will be described with reference to FIG. 8. FIG. 8 is a sequence diagram showing an example of processes performed in the in-vehicle system when the battery is charged with an external power supply. In FIG. 8, the same processes as in FIG. 6 are designated by the same reference signs as in FIG. 6. Therefore, the description of the same processes as in FIG. 6 will be omitted.

In FIG. 8, when the charging ECU 104 starts charging of the battery with an external power supply after the battery ECU 103 is activated by the trigger signal from the charging ECU 104 (S14), the SOC and the voltage of the battery change. At that time, the charging ECU 104 detects the change in the SOC or the voltage of the battery so as to detect that the charging of the battery with an external power supply has been started (S31).

The battery ECU 103 that has detected the start of charging of the battery with an external power supply transmits a trigger signal for shifting the communication terminal 200 from the sleep state to the activated state to the communication terminal 200 through the second bus CB200 (S32). Thereby, the communication terminal 200 is activated (S16), which enables communication between the ECUs 103 to 105 related to the battery and the communication terminal 200.

After activating the communication terminal 200, the battery ECU 103 transmits the first signal to the communication terminal 200 through the second bus CB200 (S33). Thereby, the communication terminal 200 is brought into a state of being able to accept the alarm information from the ECUs 103 to 105 related to the battery and into a state of being able to generate the alarm list.

During a period from when the first signal is transmitted from the battery ECU 103 to the communication terminal 200 until the charging of the battery with an external power supply is ended, the transmission of the alarm information from the ECUs 103 to 105 to the communication terminal 200, the generation of the alarm list by the communication terminal 200, and the transmission of the alarm list from the communication terminal 200 to the center server 300 are repeated at a predetermined cycle, as in FIG. 6. When the charging ECU 104 ends the charging of the battery with an external power supply (S22), the SOC and the voltage of the battery stop changing. At that time, the battery ECU 103 detects that the SOC or the voltage of the battery has stopped changing so as to detect that the charging of the battery with an external power supply has been ended (S34).

The battery ECU 103 that has detected the end of charging of the battery with an external power supply transmits the second signal to the communication terminal 200 through the second bus CB200 (S35).

According to the above-described modification, when the battery is charged with an external power supply, the communication terminal 200 can be activated using the battery ECU 103 that is activated by the charging ECU 104. As a result, the same effects as those of the above-described embodiment can be obtained.

Second Modification

In the first modification, an example has been described in which when the battery is charged with an external power supply, the communication terminal 200 is activated using the battery ECU 103 instead of the charging ECU 104. However, the communication terminal 200 may be activated using the hybrid ECU 105 instead of the charging ECU 104.

As described in the embodiment, when the charging of the battery with an external power supply is started, the voltage input to the hybrid ECU 105 via the wiring WR100 changes, which triggers activation of the hybrid ECU 105. Thereby, the hybrid ECU 105 can determine that the charging of the battery with an external power supply has been started on the condition that the voltage input via the wiring WR100 has changed. That is, the hybrid ECU 105 can detect the start of charging of the battery with an external power supply, similarly to the battery ECU 103 described above. Further, when the charging of the battery with an external power supply is ended, the voltage of the battery stops changing, so that the voltage input to the hybrid ECU 105 via the wiring WR100 also stops changing. Thereby, the hybrid ECU 105 can determine that the charging of the battery with an external power supply has been ended on the condition that the voltage input via the wiring WR100 has stopped changing. That is, the hybrid ECU 105 can also detect the end of charging of the battery with an external power supply, similarly to the battery ECU 103 described above.

Thus, in this modification, when the battery is charged with an external power supply, the hybrid ECU 105 detects the start of charging and the end of charging of the battery with an external power supply to activate the communication terminal 200 and transmit the first signal and the second signal to the communication terminal 200. In this modification, the hybrid ECU 105 corresponds to the "predetermined ECU (third ECU)" according to the present disclosure.

Figure 9:
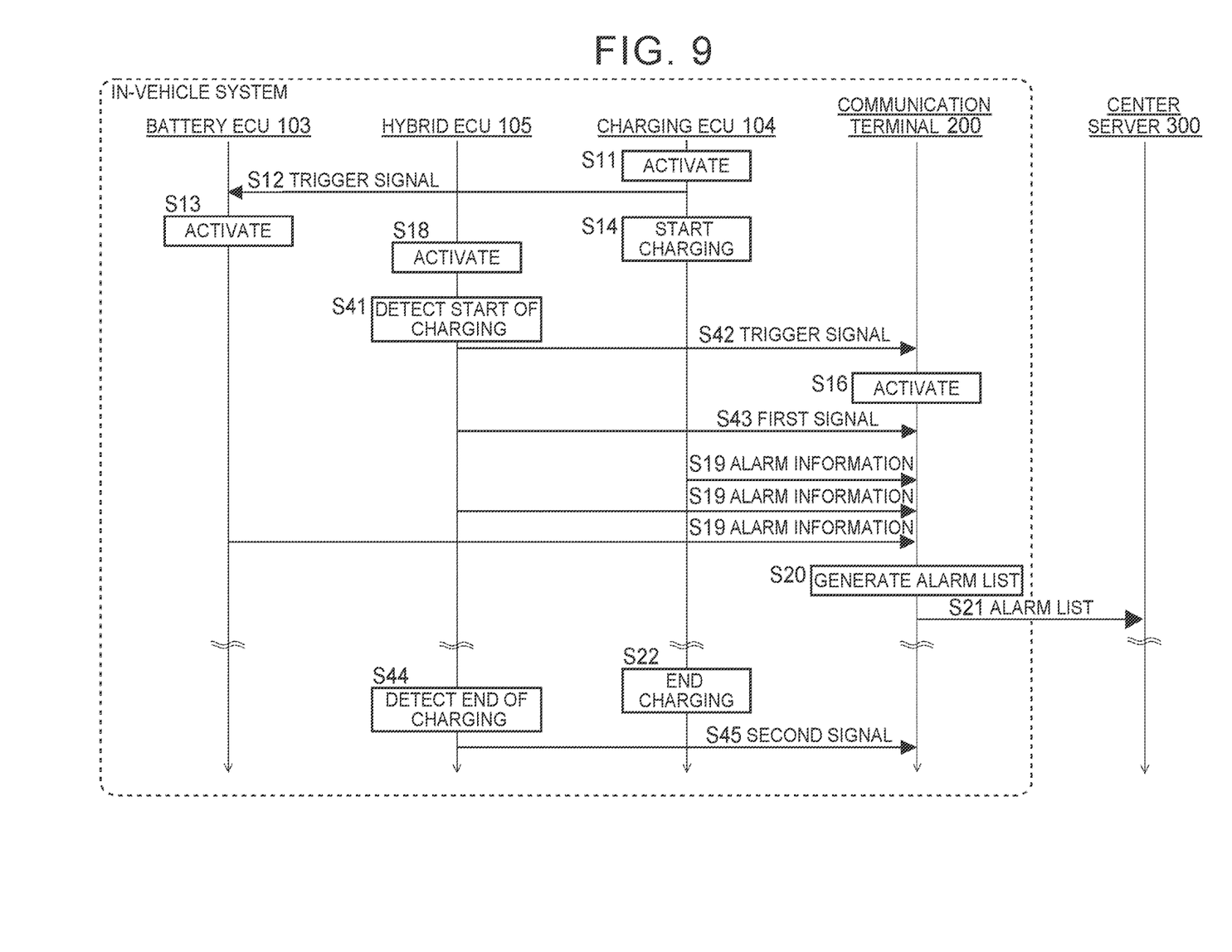
FIG. 9 is a sequence diagram showing an example of processes performed in the in-vehicle system when the battery is charged with an external power supply in a second modification.

Here, an example of the process sequence in the in-vehicle system of this modification will be described with reference to FIG. 9. FIG. 9 is a sequence diagram showing an example of processes performed in the in-vehicle system when the battery is charged with an external power supply. In FIG. 9, the same processes as in FIG. 6 are designated by the same reference signs as in FIG. 6. Therefore, the description of the same processes as in FIG. 6 will be omitted.

In FIG. 9, when the hybrid ECU 105 is activated as the charging ECU 104 starts charging of the battery with an external power supply (S18), the hybrid ECU 105 determines that the charging of the battery with an external power supply has been started on the condition that the voltage input via the wiring WR100 changes. Thereby, the hybrid ECU 105 can detect the start of charging of the battery with an external power supply (S41).

The hybrid ECU 105 that has detected the start of charging of the battery with an external power supply transmits a trigger signal for shifting the communication terminal 200 from the sleep state to the activated state to the communication terminal 200 through the second bus CB200 (S42). Thereby, the communication terminal 200 is activated (S16), which enables communication between the ECUs 103 to 105 related to the battery and the communication terminal 200.

After activating the communication terminal 200, the hybrid ECU 105 transmits the first signal to the communication terminal 200 through the second bus CB200 (S43). Thereby, the communication terminal 200 is brought into a state of being able to accept the alarm information from the ECUs 103 to 105 related to the battery and into a state of being able to generate the alarm list.

During a period from when the first signal is transmitted from the hybrid ECU 105 to the communication terminal 200 until the charging of the battery with an external power supply is ended, the transmission of the alarm information from the ECUs 103 to 105 to the communication terminal 200, the generation of the alarm list by the communication terminal 200, and the transmission of the alarm list from the communication terminal 200 to the center server 300 are repeated at a predetermined cycle, as in FIG. 6. When the charging ECU 104 ends the charging of the battery with an external power supply (S22), the voltage of the battery stops changing, and accordingly, the voltage input to the hybrid ECU 105 via the wiring WR100 also stops changing. Thereby, the hybrid ECU 105 can determine that the charging of the battery with an external power supply has been ended on the condition that the voltage input via the wiring WR100 has stopped changing. That is, the hybrid ECU 105 can detect the end of charging of the battery with an external power supply (S44).

The hybrid ECU 105 that has detected the end of charging of the battery with an external power supply transmits the second signal to the communication terminal 200 through the second bus CB200 (S45).

According to the above-described modification, when the battery is charged with an external power supply, the communication terminal 200 can be activated using the hybrid ECU 105 that is autonomously activated, triggered by the start of charging of the battery with an external power supply. As a result, the same effects as those of the above-described embodiment can be obtained.

Others

The above-described embodiment and modifications are merely examples, and the present disclosure may be appropriately modified to be implemented without departing from the scope thereof. Also, the processes and the configurations described in the present disclosure can be appropriately combined to be implemented as long as no technical contradiction occurs. Moreover, the processes described as being executed by one device may be shared and executed by a plurality of devices. Alternatively, the processes described as being executed by different devices may be executed by one device. In the computer system, it is possible to flexibly change the hardware configuration for implementing each function.

The present disclosure can also be implemented by supplying a computer with a computer program that implements the functions described in the above embodiment and modifications and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is a recording medium that can store information such as data and programs by electrical, magnetic, optical, mechanical, or chemical action and can be read from a computer or the like. Such a non-transitory computer-readable storage medium is a disc of any type such as a magnetic disc (floppy (registered trademark) disc, HDD, and the like) or an optical disc (CD-ROM, DVD, Blu-ray disc, and the like). Further, the non-transitory computer-readable storage medium may be a medium such as a read-only memory (ROM), a random access memory (RAM), an EPROM, an EEPROM, a magnetic card, a flash memory, an optical card, or a solid state drive (SSD).

What is claimed is:

1. An information processing system comprising:
a plurality of electronic control units (ECUs) mounted on a vehicle equipped with a battery that is chargeable with an external power supply and configured to control an in-vehicle device including a battery; and
a communication terminal mounted on the vehicle, the communication terminal acquiring alarm information that is information regarding presence or absence of an alarm in the in-vehicle device from the plurality of ECUs and transmitting the acquired alarm information to a predetermined server when the communication terminal is in an activated state, and the communication terminal stopping acquisition of the alarm information and transmission of the alarm information to the predetermined server when the communication terminal is in a sleep state, wherein when the communication terminal is in the sleep state, a predetermined ECU among the plurality of ECUs executes
detecting start of charging of the battery with an external power supply, and
shifting the communication terminal from the sleep state to the activated state, triggered by detection of the start of charging of the battery with an external power supply.

2. The information processing system according to claim 1, wherein the predetermined ECU is an ECU for controlling the charging of the battery, and is a first ECU that is activated when the charging of the battery with an external power supply is started.

3. The information processing system according to claim 1, wherein the predetermined ECU is a second ECU that is activated by a first ECU for controlling the charging of the battery when the charging of the battery with an external power supply is started.

4. The information processing system according to claim 3, wherein the second ECU is an ECU for managing a state of the battery.

5. The information processing system according to claim 1, wherein the predetermined ECU is a third ECU that is directly connected to the battery via a wiring for detecting a voltage of the battery and is activated when the voltage input via the wiring changes.

6. The information processing system according to claim 5, wherein:
the vehicle is a vehicle driven by a hybrid system including a motor and an internal combustion engine; and
the third ECU is an ECU for controlling the hybrid system.

7. The information processing system according to claim 1, wherein:
when the communication terminal is shifted from the sleep state to the activated state, the predetermined ECU transmits to the communication terminal a first signal indicating that the charging of the battery with an external power supply has been started; and
the communication terminal starts the acquisition of the alarm information and the transmission of the alarm information to the predetermined server, triggered by reception of the first signal.

8. The information processing system according to claim 7, wherein:
when the charging of the battery with an external power supply is ended, the predetermined ECU transmits to the communication terminal a second signal indicating that the charging of the battery with an external power supply has been ended; and
the communication terminal ends the acquisition of the alarm information and the transmission of the alarm information to the predetermined server, triggered by reception of the second signal.

* * * * *